July 16, 1968

J. C. GRANT 3,392,416

HINGED PIPE WIPER

Filed Dec. 14, 1966

INVENTOR.
JOHN C. GRANT

BY *John O. Evans, Jr.*

ATTORNEY

July 16, 1968
J. C. GRANT
3,392,416
HINGED PIPE WIPER
Filed Dec. 14, 1966
4 Sheets-Sheet 3
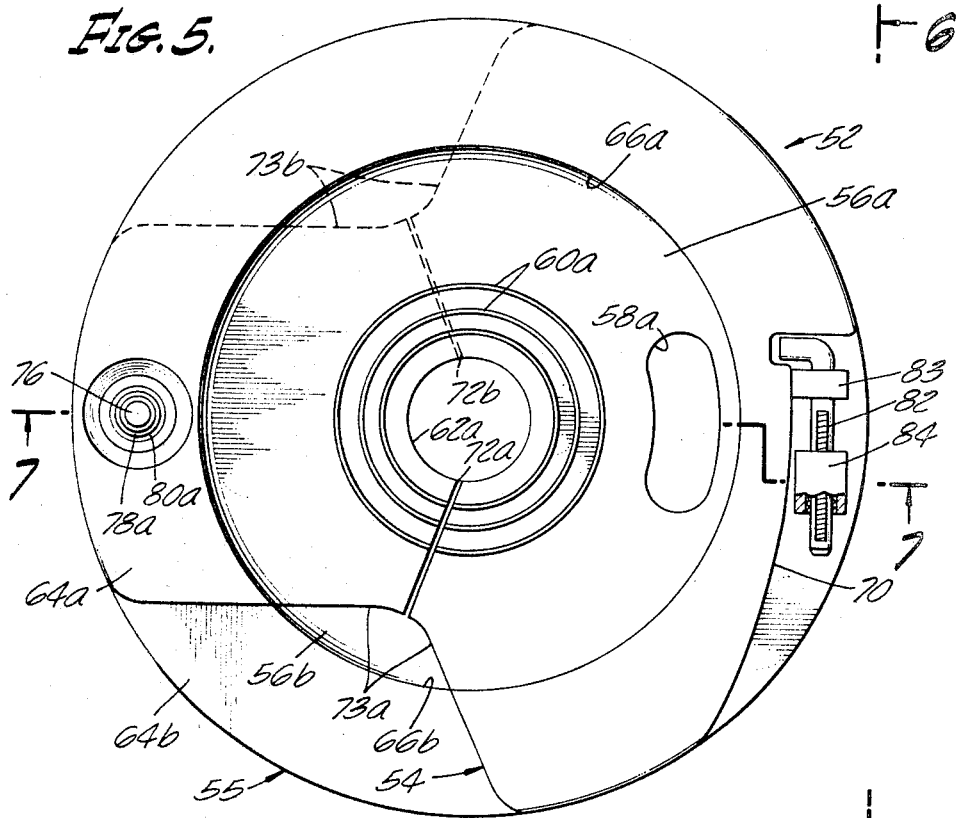
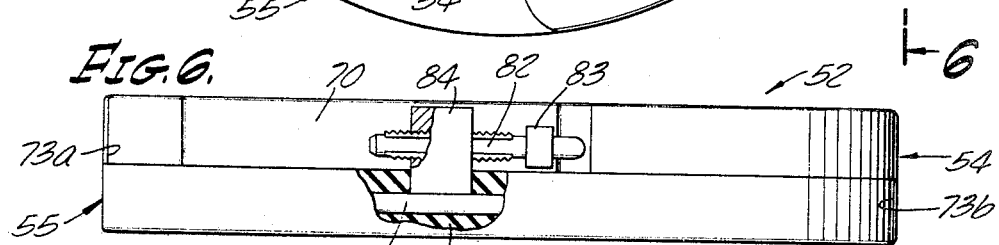
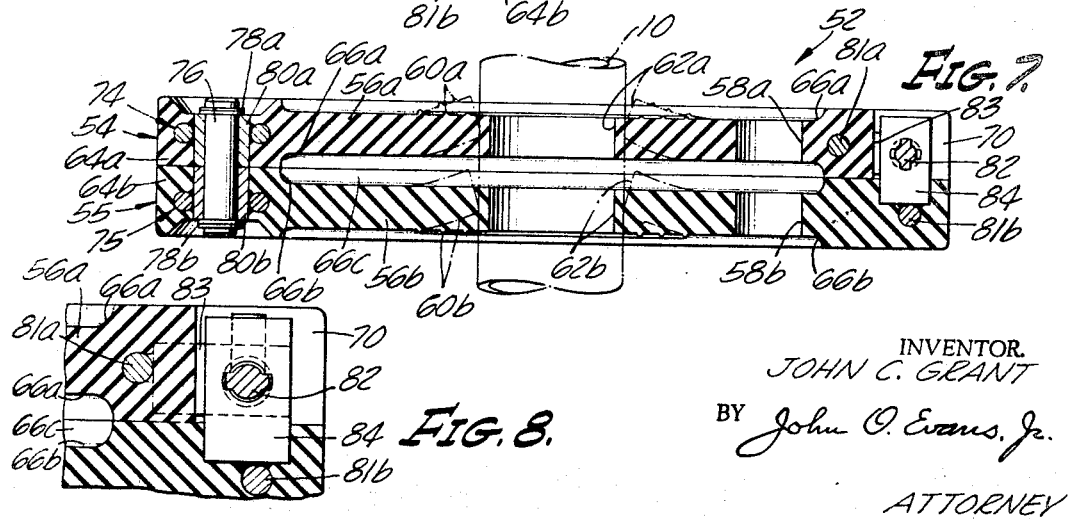
INVENTOR.
JOHN C. GRANT
BY John O. Evans, Jr.
ATTORNEY July 16, 1968  J. C. GRANT  3,392,416
HINGED PIPE WIPER Filed Dec. 14, 1966  4 Sheets-Sheet 4

INVENTOR.
JOHN C. GRANT
BY John O. Evans, Jr.
ATTORNEY 3,392,416
HINGED PIPE WIPER
John C. Grant, Huntington Park, Calif., assignor to Byron Jackson, Inc., Long Beach, Calif., a corporation of Delaware
Filed Dec. 14, 1966, Ser. No. 601,742
11 Claims. (Cl. 15—210)

ABSTRACT OF THE DISCLOSURE

A wiper for cleaning pipe which includes a pair of parallel elastomeric annular discs with a circumferentially spaced opening or slit in each from its inner to its outer periphery, the inner annular portions spaced apart to provide separate wiping surfaces, and the discs pivotable in parallel planes from an axially aligned position in which the inner peripheries are engageable with the pipe for wiping to a divergent position for removal and installation, and means for securing the discs in their axially aligned position.

---

This invention relates to wipers for cleaning mud, oil, and other foreign material from pipe, tubing, rods, kellies, cable, rope, wire, and the like as they are being drawn through the wiper, and in particular to pipe wipers for wiping drill pipe or tubing as it is being pulled from a well. More specifically, it is concerned with those wipers comprising two halves which open by hinging for installation and removal.

It is common practice when pulling pipe from oil wells to clean the drilling mud and oil from the pipe by means of a wiper in the form of an annular disc of flexible material, usually rubber or other elastomeric composition, placed at the top of the well below the rotary table, and through which the pipe is drawn. The extraneous material is thus removed by the inner edge surfaces at the central opening of the wiper, and allowed to drip or flow back into the well. Most wipers generally in use have an unbroken annular disc or pair of discs, and are stretched over the end of the pipe preparatory to wiping. This is an inconvenient procedure, as the pipe must be unjointed to effect the installation. For that reason a need has developed for wipers which may be installed from the side of the pipe, intermediate its ends, and further, for wipers which may be adjusted to provide additional service when the wiping edge becomes worn, and to provide for variation of the grip against the pipe for different wiping conditions.

One form of hinged wiper comprising two flat discs is shown in United States Patent No. 2,928,114, issued Mar. 15, 1960, to L. W. Ballard. This present invention is an improvement over the wiper of the foregoing patent and provides two separate wiping surfaces by separating the wiping discs. This also allows for drainage of drilling mud and other wiped material which tends to collect between unspaced plates or discs and thereby reduce wiping effectiveness. The wipers of the present invention clean the pipe more thoroughly because each of the two spaced-apart wiping surfaces encompasses practically the full circumference of the pipe, except for a narrow slit, so there is effectively a double wiping action with close to 720° of wiping edge in contact with the pipe; and service life is also enhanced because the reinforcing springs are resilient, allowing the whole wiper to flex with the passage of pipe, joints, and other enlargements through the central opening of the elastomeric or rubber wiper discs or leaves. Additionally, in the present invention, provision has been made for fast installation and removal, and for fine adjustment to compensate for wear and surface conditions of the pipe being wiped.

Some of the features of the present invention are also included in my prior copending application, Ser. No. 391,639, filed Aug. 24, 1964, now United States Patent No. 3,329,987, issued July 11, 1967.

It is a primary object of the present invention to provide a pipe wiper which may be laterally installed, and which has the wiping edge surfaces of adjacent webs or discs spaced apart for multiple wiping action.

Another object of the present invention is to provide a pipe wiper of two pivoted webs or leaves, one overlying the other, easily spreadable for installation around a pipe, and with retaining means for holding it in closed wiping position around the pipe.

An additional object of the invention is to provide a hinged pipe wiper with multiple wiping edge surfaces of full circumferential coverage at the inner peripheral wall portion of the wiper leaves to avoid unwiped streaks on the pipe, and to insure alignment of the two wiping discs or leaves.

Still another object is to provide a pipe wiper with spring reinforcing members in its periphery to provide added flexibility, and resultant longer service life.

Yet another object of the invention is to provide a pipe wiper quickly and easily installed on, removed from, or adjusted on, the pipe, and with substantially 720° of wiping surface against the pipe.

A further object of the invention is to provide a pipe wiper with multiple wiping edge surfaces, with resultant good drainage for extraneous material wiped from the pipe.

Another further object of this invention is to provide a hinged pipe wiper, the normal operation of which in wiping pipe tends to retain it more securely in latched engagement around the pipe.

A still further object of the invention is to provide a pipe wiper adapted for side installation around the pipe, the constriction around the pipe being adjustably variable to compensate for pipe size or condition or for wear of the elastomeric wiping edges at the central opening of the wiper.

Briefly, the invention comprises a pipe wiper for cleaning mud and the like from pipe including a pair of elastomeric leaves, one overlying the other and parallel to it, each having an inner wall portion defining a central opening, the openings being axially aligned. Pivot means is provided offset from the openings for pivoting the leaves relative to one another in parallel planes. Each leaf also has transverse wall portions forming a slit from the central opening to the outer periphery, the slits being on opposite sides when the openings of the leaves are axially aligned. There are also spacer means provided between the leaves so that the inner peripheral wall portions are spaced apart, and means for securing the leaves in axial alignment on the pipe.

Further objects and advantages will appear as the invention is described in greater detail in the following description taken with the drawings, in which like reference characters in the various figures designate corresponding parts.

In the drawings:

FIG. 5 is a plan view, partly in section, of a modified form of wiper in accordance with the invention;

FIG. 6 is a right side elevational view of the wiper, partly in section, taken on the line 6—6 of FIG. 5, looking in the direction of the arrows;

FIG. 7 is a sectional view, taken on the line 7—7 of FIG. 5, looking in the direction of the arrows, and showing also in phantom the wiper as installed on a pipe;

FIG. 8 is a partial sectional view on an enlarged scale through the adjustment latch, showing it in its unlatched position.

Figure 1:
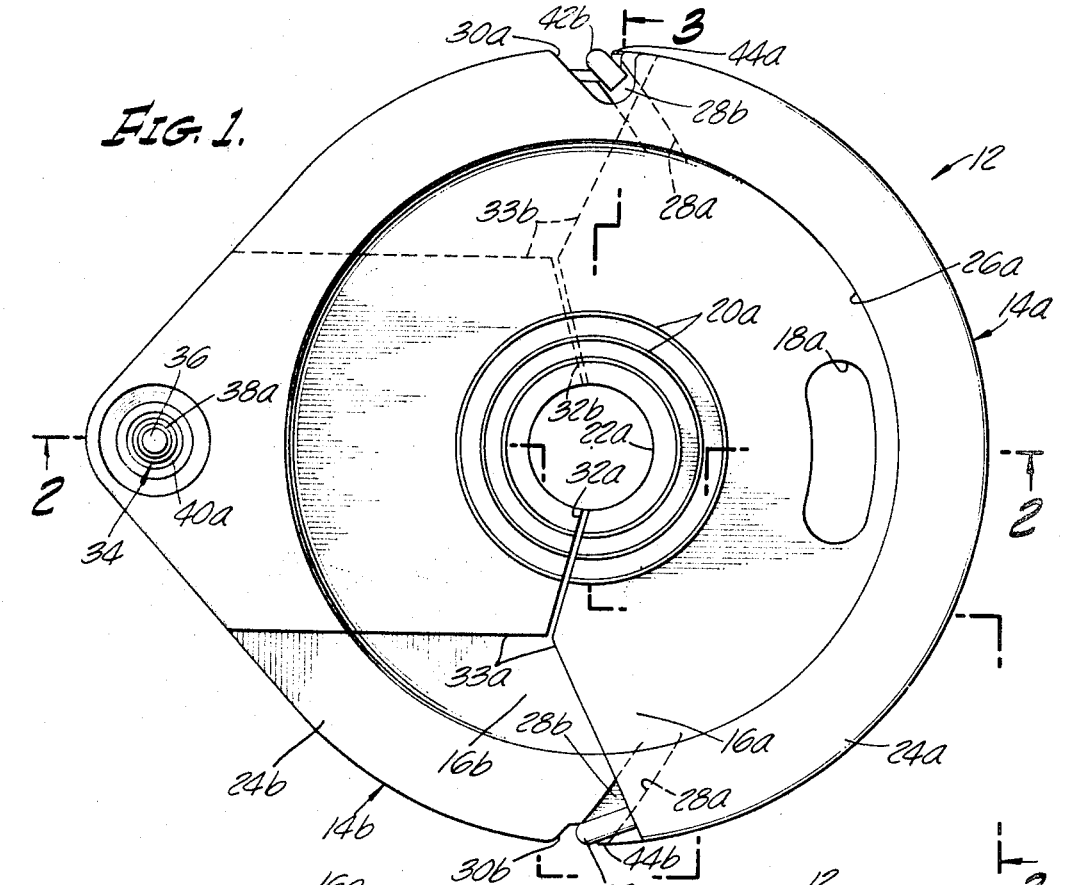
FIG. 1 is a plan view of one form of wiper in accordance with the present invention.
Figure 2:
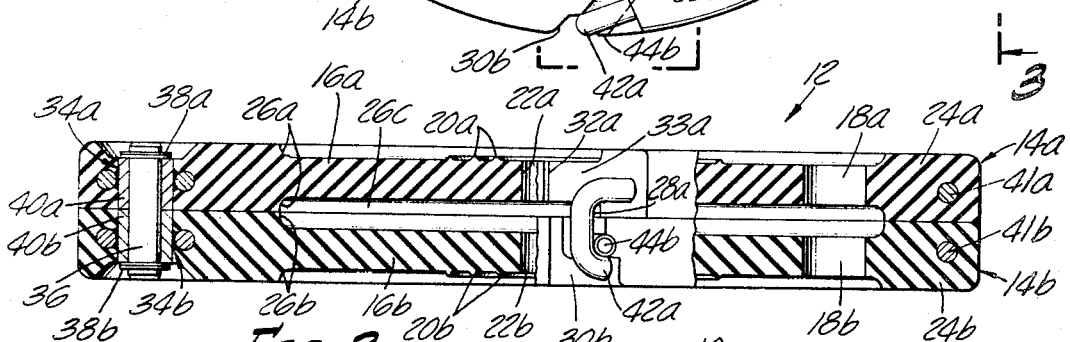
FIG. 2 is a sectional view, taken on the line 2—2 of FIG. 1, and looking in the direction of the arrows, a fragment of the wiper being shown in elevation.
Figure 3:
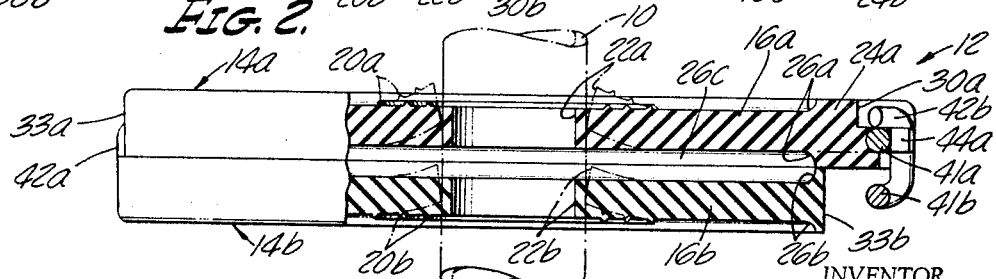
FIG. 3 is a sectional view, taken on the line 3—3 of FIG. 1, looking in the direction of the arrows, and showing also a portion in elevation, and in phantom the wiper as installed on a pipe.

Referring to FIGS. 1, 2 and 3, a pipe wiper assembly 12, exemplary of this invention, is shown in its closed position, the two identical halves 14a and 14b being aligned face-to-face and pivotally connected with a hinge pin or pivot means 36, the latter held in place by retaining rings 38a and 38b. The inner peripheral wall portions or central openings 22a and 22b form wiping lips or edges against a pipe 10, the lips or wiping surfaces 22a and 22b being shown in wiping positions in phantom lines in FIG. 3. The wiper halves 14a and 14b have recesses 26a and 26b, respectively, to provide thinner flexible webs or leaves 16a and 16b, the unrelieved portions providing spacers or ribs 24a and 24b at the outer periphery and the inner relieved portions providing a space 26c between the webs or leaves 16a and 16b. The leaves 16a and 16b are provided with transverse slits 32a and 32b extending laterally outward in opposite directions from the inner peripheries 22a and 22b to about midway to the outer peripheries, at which midway points the slits 32a and 32b widen with divergent walls 33a and 33b through the spacers 24a and 24b to provide an opening from inner periphery to outer periphery of the wiper halves 14a and 14b for exit and entry of the pipe 10. The slits 32a and 32b, in order that they will be on opposite sides of the central opening of the wiper 12, are positioned so that they are approximately normal to a plane through the axis of the pivot pin 36. Embedded in the spacers or ribs 24a and 24b is reinforcing fastener member 34 with identical reinforcing members or inserts 34a and 34b, including, respectively, flexible metal springs 41a and 41b connected, preferably by welding, to sleeves or bushings 40a and 40b, through which the hinge pin 36 is inserted for pivotal mounting. The wiper halves 14a and 14b are provided with concentric guide rings 20a and 20b, respectively, which are used as guides in cutting the central openings 22a and 22b to fit pipe of larger diameter. The halves 14a and 14b also have drain holes or windows 18a and 18b, respectively, which provide for drainage of drilling mud which might otherwise tend to collect and cake between the webs 16a and 16b, the windows also serving as sight holes and manipulative hand grips. The adjacent recesses 26a and 26b of the wiper halves 14a and 14b form a space 26c between the webs 16a and 16b, for better drainage of mud wiped by the upper web 16a and so that the webs may function independently, providing two separate wiping lips 22a and 22b against the surface of the pipe 10, as seen best in FIG. 3.

Figure 4:
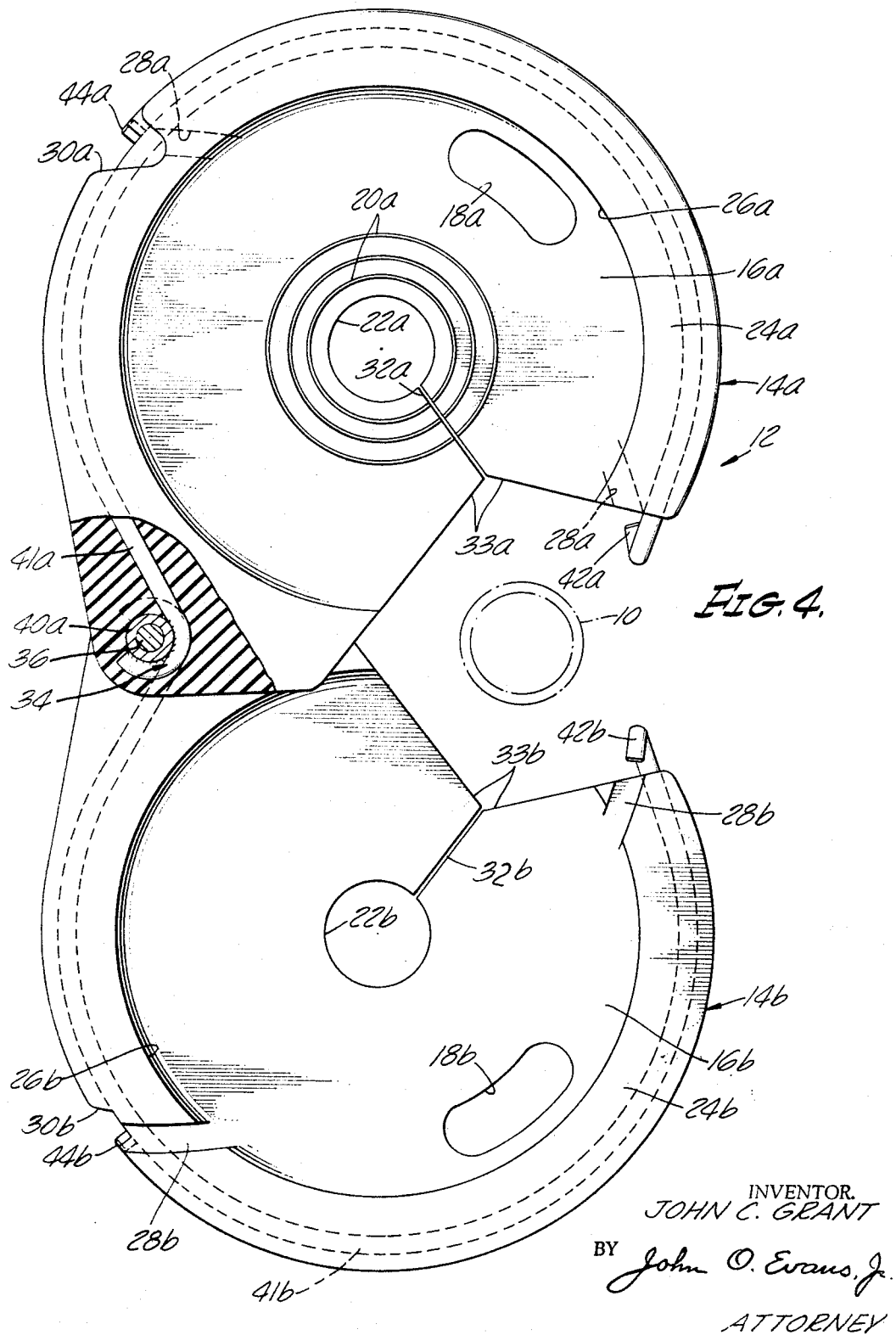
FIG. 4 is a plan view of the wiper of FIG. 1, partly in section, showing the wiper halves in divergent position for installation on a pipe.

Referring also to FIG. 4, where the wiper 12 is shown in the open position, the two halves 14a and 14b being spread open for installation on the pipe 10, the spring inserts 41a and 41b are shown extending through the divergent walls 33a and 33b to form the exposed hooks or latches 42a and 42b. In closing the wiper halves 14a and 14b around the pipe 10 to the positions shown in FIGS. 1, 2 and 3, the hooks 42a and 42b travel through rib grooves 28b and 28a, respectively, and into cutouts 30b and 30a of ribs 24b and 24a to hook over catches or lugs 44b and 44a, which are welded to the springs 41b and 41a, respectively, in arcuate alignment with their mating hooks 42a and 42b and respective rib grooves 28b and 28a.

Referring now to FIGS. 5, 6, 7 and 8, a pipe wiper assembly 52, a modified embodiment of the invention is shown in its closed position, the two halves 54 and 55 being aligned face-to-face and pivotally connected with a hinge pin or pivot means 76, the latter held in place by retaining rings 78a and 78b. The inner peripheral wall portions or central openings 62a and 62b are shown in wiping positions around the pipe 10 in phantom lines in FIG. 7. The wiper halves 54 and 55 have recesses 66a and 66b, respectively, to provide thinner, flexible webs or leaves 56a and 56b, the unrelieved portions providing spacers or ribs 64a and 64b at the outer periphery and the inner relieved portions providing a space 66c between the webs or leaves 56a and 56b. The leaves 56a and 56b are provided with transverse slits 72a and 72b extending laterally outward in opposite directions from the inner peripheries 62a and 62b to about midway to the outer peripheries, at which midway point the slits 72a and 72b widen with divergent walls 73a and 73b through the spacers 64a and 64b to provide an opening from inner periphery to outer periphery of the wiper halves 54 and 55 for exit and entry of the pipe 10. The slits 72a and 72b, in order that they will be on opposite sides of the central opening of the wiper 52, are positioned so that they extend approximately normal to a plane through the axis of the pivot pin 76. Embedded in the spacers or ribs 64a and 64b are reinforcing members or inserts 74 and 75, respectively, with their flexible metal springs 81a and 81b connected, preferably by welding, to sleeves or bushings 80a and 80b, through which the hinge pin 76 is inserted for pivotal mounting. The wiper halves 54 and 55 are provided with concentric guide rings 60a and 60b, respectively, which are used as guides in cutting the central openings 62a and 62b to fit pipe of various diameters. The halves 54 and 55 also have drain holes or windows 58a and 58b, respectively, which allow drainage of mud or debris which might otherwise tend to collect and cake between the webs 56a and 56b, the windows also serving as sight holes and manipulative hand grips. The adjacent recesses 66a and 66b of the wiper halves 54 and 55 provide a space 66c between the webs 56a and 56b, so that the latter may function independently, providing two separate wiping lips 62a and 62b against the surface of the pipe 10, as best seen in FIG. 7.

Figure 9:
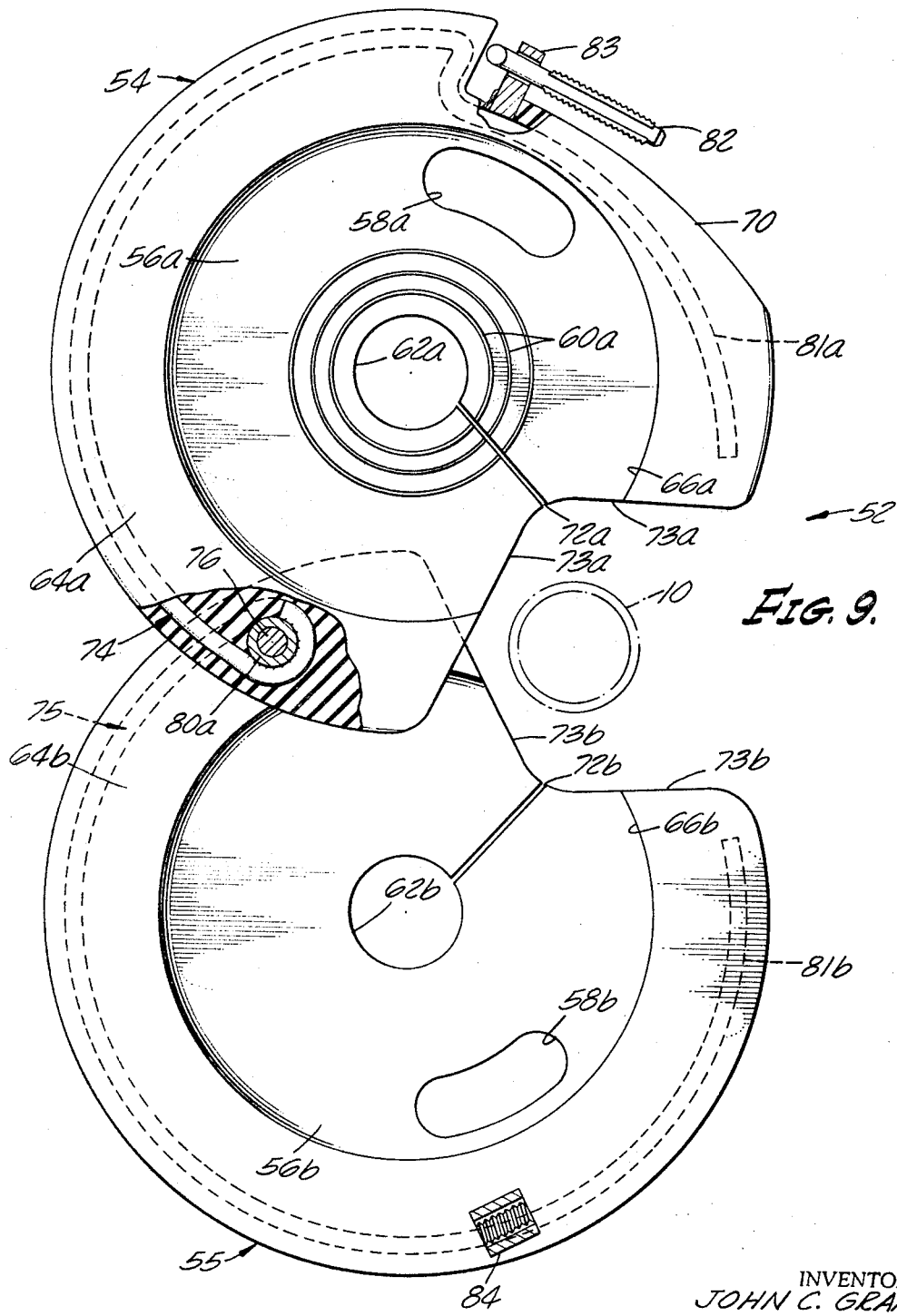
FIG. 9 is a plan view of the wiper of FIG. 5, partly in section, showing the wiper halves in divergent position for installation on a pipe.

Referring also to FIG. 9, the wiper 52 is shown in the open position, the two halves 54 and 55 being pivoted and spread open for installation on the pipe 10. The outer periphery of spacer rib 64a is relieved with a cutout 70 provide clearance for a latch or bolt 82, rotatably fitted to a guide 83 which in turn is attached, preferably by welding, to the embedded steel spring 81a. To the steel spring 81b of the other wiper half 55 is attached, by welding, the catch or nut 84 in arcuate alignment with the latch or bolt 82.

In a typical employment of a pipe wiper 12 of this invention for cleaning an oil well drill pipe 10 as it is being withdrawn from a well, the two halves 14a and 14b are opened or spread apart by hinging about the pivot pin 36 as illustrated in FIG. 4, and then closed about the pipe 10 by a reverse pivot action, the pipe 10 by relative motion entering the outer peripheral openings of the wiper halves 14a and 14b, guided by the divergent wall portions 33a and 33b into the transverse slits 32a and 32b and on into the central openings 22a and 22b. The hooks 42a and 42b are meantime traveling arcuately across the opposite wiper halves 14b and 14a through spacer rib grooves 28b and 28a and into cutouts 30b and 30a to hook around their mating lugs or catches 44b and 44a, with which they are arcuately aligned, thus securing the wiper 10 in the closed or operating position around the pipe, as shown in FIGS. 1, 2 and 3. The wiper is either installed thusly below the derrick floor and rotary table of the drilling rig (not shown), or installed above the floor and lowered down through it, restrained then from upward movement by the master bushing of the rotary table. Depending on the size of the pipe to be wiped, the central openings 22a and 22b are pre-cut to the proper diameter, using the cutting guide rings 20a and 20b as guides to obtain the proper size. The central opening being smaller than the pipe 10 being cleaned, as shown in FIG. 3, there is a squeegee or wiping action of the wiping edges or lips 22a and 22b against the surface of the pipe 10; and the resultant outward force tends to keep the hooks or latches 42a and 42b locked about the respective lugs or catches 44b and 44a. The relief resulting from the recesses 26a and 26b provides more flexible and effective wiping, at the same time providing two 360° wiping lips 22a and 22b, separated by the space 26c to insure a complete cleaning of the pipe surfaces, with no unwiped streaks. The space 26c and the drain holes or windows 18a and 18b allow for drainage of drilling mud and other debris wiped by the top web and which otherwise might be trapped and caked between the leaves or webs 16a and 16b, resulting in inefficient cleaning of the pipe. The windows 18a and 18b also provide additional flexibility for the webs 16a and 16b, and serve as hand grips for opening and closing the wiper around the pipe. Flexibility and more effective wiping of the rubber or elastomeric wiper halves 14a and 14b are assured also by the use of the steel reinforcing insert springs 41a and 41b. Removal of the wiper is accomplished by a radial side pressure against the outer peripheries of the wiper halves 14a and 14b to unlatch the hooks 42a and 42b from their catches 44b and 44a, respectively, on the opposite side; completion of the removal of the wiper 12 from the pipe 10 is then accomplished by the reversal of the installation procedure described above.

The practice of the modified embodiment of the pipe wiper 52 for installation on, wiping, and removal from a pipe 10 is identical to that described for the wiper 12, except for the latching, unlatching, and the added adjustment feature. The piper wiper 52 is opened preparatory to installation about the pipe 10 as shown in FIG. 9, and then closed to install it on the pipe as in FIGS. 5, 6 and 7 by pivoting the two halves 54 and 55 about their common hinge pin 76. The latch bolt 82 and the catch or nut 84, which form a breach-lock type securing device, being arcuately aligned, as the wiper halves 54 and 55 are pivoted about the pin 76, the equally-spaced longitudinal rows of threads on the latch or bolt 82 enter the internal grooves between the longitudinal rows of internal threads of the catch or nut 84 as shown in FIG. 8; then as the latch bolt 82 is rotated in the latch guide 83, the threads of the bolt 82 engage the mating threads of the catch or nut 84 to lock the wiper 52 in its closed position as shown in FIGS. 5, 6 and 7, with the wiping lips 62a and 62b exerting a tight squeegee or wiping force against the pipe to clean it, as illustrated in FIG. 7. The resultant reacting outward force provides tension in the latch threads, tending to retain the bolt 82 and nut 84 in the locked position. As the wiping edge surfaces or lips 62a and 62b wear, or for more wiping pressure against the pipe 10, the latch or bolt 82 may be engaged farther into the catch or nut 84 and secured; or, conversely, by less axial engagement a lighter pressure may be exerted against the pipe if desired.

While two forms of hinged wipers of this invention have been shown by way of illustration and description, they should be considered as merely exemplary of the invention and are not intended to limit the scope of the claims.

I claim:

1. A pipe wiper for cleaning mud and the like from pipe comprising:
   (a) a first leaf of elastomeric material;
   (b) a second leaf of elastomeric material parallel to and overlying said first leaf;
   (c) each said leaf having an inner peripheral wall portion defining a central opening, the openings of said leaves being in axial alignment;
   (d) pivot means offset from said openings for pivoting said leaves relative to and parallel to one another;
   (e) each said leaf having transverse wall portions defining a lateral slit communicating said central opening with the outer periphery of said leaf, the slits of said leaves being on opposite sides of said openings when the latter are axially aligned;
   (f) spacer means between said first leaf and said second leaf whereby said inner peripheral wall portions are spaced apart axially; and
   (g) means for securing said leaves in axial alignment about the pipe.

2. A pipe wiper as defined in claim 1 wherein said inner peripheral wall portion of each leaf encompasses substantially 360°.

3. A pipe wiper as defined in claim 1 wherein said lateral slit comprises substantially abutting inner wall portions and divergent outer wall portions.

4. A pipe wiper as defined in claim 1 wherein each said leaf includes a flexible reinforcing member.

5. A pipe wiper for cleaning mud and the like from pipe comprising:
   (a) a first leaf of elastomeric material;
   (b) a second leaf of elastomeric material parallel to and overlying said first leaf;
   (c) each said leaf having an inner peripheral wall portion defining an axially aligned central opening extending transversely through said leaf, with the openings of said leaves being in axial alignment;
   (d) pivot means substantially offset from said central openings for pivoting said leaves relative and parallel to one another;
   (e) each said leaf having other wall portions defining a transverse slit communicating said central opening with the outer edge of said leaf, said slit being substantially normal to a plane containing the axis of said pivot means at the midpoint of said slit, the slits of said respective leaves being disposed on opposite sides of said axially aligned central openings;
   (f) said leaves being pivotable in one direction on said pivot means for removal from a pipe received in said openings by relative movement of the pipe through said slits, and being pivotable in the opposite direction on said pivot means for reception of the pipe in said openings by relative movement of the pipe through said slits in the opposite direction;
   (g) said other wall portions of each said leaf being in substantially mutually abutting relation, and said inner peripheral wall portion of each leaf extending substantially 360° around said opening, said wall portions being adapted to resiliently engage the walls of a pipe inserted in said openings, and to clean the walls of the pipe as the latter is drawn therethrough; and
   (h) spacer means between said first leaf and said second leaf whereby to provide a space between said axially aligned central openings so that said inner peripheral wall portions are spaced apart axially.

6. A pipe wiper for cleaning mud and the like from pipe comprising:
   (a) a first leaf of elastomeric material;
   (b) a second leaf of elastomeric material parallel to and overlying said first leaf;
   (c) each said leaf having an inner peripheral wall portion defining an axially aligned central opening extending transversely through said leaf, with the openings of said leaves being in axial alignment;

(d) pivot means substantially offset from said central openings for pivoting said leaves relative and parallel to one another;

(e) each said leaf having other wall portions defining a transverse slit communicating said central opening with the outer edge of said leaf, said slit being substantially normal to a plane containing the axis of said pivot means at the midpoint of said slit, the slits of said respective leaves being disposed on opposite sides of said axially aligned central openings;

(f) said leaves being pivotable in one direction on said pivot means for removal from a pipe received in said openings by relative movement of the pipe through said slits, and being pivotable in the opposite direction on said pivot means for reception of the pipe in said openings by relative movement of the pipe through said slits in the opposite direction;

(g) said other wall portions of each said leaf being in substantially mutually abutting relation, and said inner peripheral wall portion of each leaf extending substantially 360° around said opening, said wall portions being adapted to resiliently engage the walls of a pipe inserted in said openings, and to clean the walls of the pipe as the latter is drawn therethrough;

(h) said transverse slit of each said leaf including divergent wall portions, the divergency extending outward from a point substantially midway between said central opening and said outer edge, whereby to allow entry of the pipe through said slits to align said central openings around the pipe;

(i) a flexible reinforcing first insert embedded at substantially the outer periphery of said first leaf, said first insert extending from said pivot means to said divergent wall portion, and having intermediate its ends a latch member carried by said first insert;

(j) a flexible reinforcing second insert embedded at substantially the outer periphery of said second leaf, said second insert extending from said pivot means to said divergent wall portion, and having intermediate its ends a catch member carried by said second insert; and (k) said members being so positioned that they may be adjustably engaged and secured when said leaves are in axial alignment about the pipe.

7. A pipe wiper as defined in claim 6, wherein:
(a) said catch member comprises a nut; and
(b) said latch member comprises a bolt rotatably mounted on said second insert.

8. A pipe wiper as defined in claim 7, wherein:
(a) said nut includes an internal thread interrupted longitudinally at equally spaced intervals; and
(b) said bolt includes rotating means and an external thread interrupted longitudinally at equally spaced intervals to mate with said threads of said nut, whereby to provide axial engagement and disengagement of said members.

9. A pipe wiper as defined in claim 8, wherein said members may be variably engaged, whereby to vary the resilient wiping engagement of said inner peripheral wall portions of said central openings against the pipe.

10. A pipe wiper for cleaning mud and the like from pipe comprising:
(a) a first leaf of elastomeric material;
(b) a second leaf of elastomeric material parallel to and overlying said first leaf;

(c) each said leaf having an inner peripheral wall portion defining an axially aligned central opening extending transversely through said leaf, with the openings of said leaves being in axial alignment;

(d) pivot means substantially offset from said central openings for pivoting said leaves relative and parallel to one another;

(e) each said leaf having other wall portions defining a transverse slit communicating said central opening with the outer edge of said leaf, said slit including divergent wall portions, the divergency extending outward from a point substantially midway between said central opening and said outer edge, and the inner portions of said slits being substantially normal to a plane containing the axis of said pivot means and being disposed on opposite sides of said axially aligned central opening;

(f) said leaves being pivotable in one direction on said pivot means for removal from a pipe received in said openings by relative movement of the pipe through said slits, and being pivotable in the opposite direction on said pivot means for reception of said pipe in said openings by relative movement of said pipe through said slits in the opposite direction;

(g) a flexible reinforcing first member embedded at substantially the outer periphery of said first leaf, said first member extending from said pivot means to said divergent wall portion, and having intermediate its ends a latch member carried by said first member and projecting from said first leaf;

(h) a flexible reinforcing second member embedded at substantially the outer periphery of said second leaf, said second member extending from said pivot means to said divergent wall portion, and having intermediate its ends a catch member carried by said second member and projecting from said second leaf;

(i) said latch member and said catch member being adjustably engageable when said leaves are in axial alignment about the pipe; and (j) said other wall portions of each said leaf being in substantially mutually abutting relation, and said inner peripheral wall portion of each said leaf extending substantially 360° around said opening, said wall portions being adapted to resiliently engage the walls of a pipe inserted in said openings, and to clean the walls of the pipe as the latter is drawn therethrough.

11. A pipe wiper as defined in claim 10, wherein:
(a) said catch member comprises a nut with internal threads interrupted longitudinally at equally spaced intervals; and
(b) said latch member comprises a pivotally-mounted bolt with external threads interrupted longitudinally at equally spaced intervals to mate complementally with said nut, whereby to allow varying axial engagement and disengagement of said catch and latch members to constrict and extend the peripheries of said leaves.

References Cited

UNITED STATES PATENTS

| | | | |
|---|---|---|---|
| 2,928,114 | 3/1960 | Ballard | 15—210.2 |
| 3,329,987 | 7/1967 | Grant | 15—210.2 |

CHARLES A. WILLMUTH, *Primary Examiner.*

LEON G. MACHLIN, *Examiner.*